United States Patent
Dietz

(10) Patent No.: US 6,175,820 B1
(45) Date of Patent: Jan. 16, 2001

(54) CAPTURE AND APPLICATION OF SENDER VOICE DYNAMICS TO ENHANCE COMMUNICATION IN A SPEECH-TO-TEXT ENVIRONMENT

(75) Inventor: Timothy Alan Dietz, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/238,809

(22) Filed: Jan. 28, 1999

(51) Int. Cl.⁷ .............................. G10L 15/26; G10L 13/00
(52) U.S. Cl. .................... 704/235; 704/260; 704/276; 704/278
(58) Field of Search .................... 704/235, 260, 704/278, 276

(56) References Cited

U.S. PATENT DOCUMENTS

| | | | |
|---|---|---|---|
| 5,799,273 | * 8/1998 | Mitchell | 704/235 |
| 5,799,280 | * 8/1998 | Degen et al. | 704/276 |
| 5,842,167 | * 11/1998 | Miyatake et al. | 704/260 |
| 5,860,064 | * 1/1999 | Henton | 704/260 |
| 6,088,675 | * 7/2000 | MacKenty et al. | 704/270 |

* cited by examiner

Primary Examiner—David R. Hudspeth
Assistant Examiner—Abul K. Azad
(74) Attorney, Agent, or Firm—Richard A. Henkler; Felsman, Bradley, Vaden, Gunter & Dillon, LLP

(57) ABSTRACT

A method for providing voice dynamics of human utterances converted to and represented by text within a data processing system. A plurality of predetermined parameters for recognition and representation of dynamics in human utterances are selected. An enhanced human speech recognition software program is created implementing the predetermined parameters on a data processing system. The enhanced software program includes an ability to monitor and record human voice dynamics and provide speech-to-text recognition. The dynamics in a human utterance is captured utilizing the enhanced human speech recognition software. The human utterance is converted into a textual representation utilizing the speech-to-text ability of the software. Finally, the dynamics are merged along with the textual representation of the human utterance to produce a marked-up text document on the data processing system.

24 Claims, 4 Drawing Sheets

CAPTURE AND APPLICATION OF SENDER VOICE DYNAMICS TO ENHANCE COMMUNICATION IN A SPEECH-TO-TEXT ENVIRONMENT

BACKGROUND OF THE INVENTION

1. Technical Field

The present invention relates in general to data processing systems, and in particular to a method and system for enhanced speech recognition environment on a data processing system. Still more particularly, the present invention relates to a method and system for providing voice dynamics in a speech-to-text application within a speech recognition environment on a data processing system.

2. Description of the Related Art

Human speech recognition technology has been around for several years and is well known in the art and is commercially available. Speech analysis and speech recognition algorithms, machines, and devices are becoming more and more common. Such systems have become increasingly powerful and less expensive. Those familiar with the technology are aware that various applications exist which recognize human speech and stores it in various forms on a data processing system. One extension of this technology is in speech-to-text application which provides a textual representation on a data processing system of human speech. Speech recognition software is being utilized every day by hundreds of thousands of people.

Speech-to-text applications have evolved as one of the ultimate goals of speech recognition technology. Many current applications utilize this technology to convert spoken language into text form which is then made accessible to a user of the data processing system.

Within recent years, an explosion in the utilization of voice recognition systems has occurred. One goal of voice recognition systems is to provide a more humanistic interface for operating a data processing system. Voice recognition systems, typically, are utilized with other input devices, such as a mouse, keyboard, or printer, to supplement the input/output (I/O) processes of voice recognition systems.

Some common examples of the implementation of voice recognition technology are Dragon™ (a product of COREL) and ViaVoice™ and IBM Voicetype™, both products of International Business Machines Corporation (IBM).

ViaVoice Executive Edition is IBM's most powerful continuous speech software. ViaVoice Executive offers direct dictation into most popular Windows applications, voice navigation of your desktop and applications and the use of intuitive "natural language commands" for editing and formatting Microsoft Word documents.

In order for voice recognition be useful to a user of a data processing system, various means of outputting the human speech signal for user interface is required. This aspect of human speech recognition is quickly developing and is well known in the art.

Standard Generalized Markup Language (SGML) has been developed to provide additional information when outputting text to provide a recipient with a more detailed output. The Java Speech Markup Language (JSML) is particularly developed for marking up text that will be spoken on devices incorporating the java speech API (Java is a trademark of Sun Microsystems, Inc.).

The Java Speech Markup Language is utilized by applications to annotate text input to Java Speech Application Programming Interface (JSAPI) speech synthesizers. The JSML elements provide a speech synthesizer equipped with the JSAPI with detailed information on how to say the text. JSML includes elements that describe the structure of a document, provide pronunciations of words and phrases, and place markers in the text. JSML also provides prosodic elements that control phrasing, emphasis, pitch, speaking rate, improves the quality and naturalness of the synthesized voice. JSML utilizes the Unicode character set so JSML can be utilized to markup text in most languages.

The current market consists of different forms of voice recognition. These different forms are: Speaker Dependent, Speaker Independent, Command * Control, Discrete Speech Input, Continuous Speech Input and Natural Speech Input.

Natural Speech Input is the ultimate goal in Voice Recognition Technology. To be able to talk to your computer in no specific manner and have the computer understand what the user wants, then apply the commands or words. One aspect of natural speech input is the ability to capture speaker voice dynamics to convey additional meaning to the text created. Currently no application exists which can capture speech dynamics and convert them to a text document representing the spoken text.

As voice recognition technology evolves, there will be a need to facilitate the retention of subtleties often lost in the process. Much of a verbal message's value is in the tone, emphasis inflection, volume, etc., which is mostly or entirely lost today. If all or part of this information content could be captured and passed along with the text message created through speech-to-text software, the formation content to the recipient would be greatly enhanced.

Further, although speech capture is well known, no current method or application exists which bridges the gap between speech recognition and speech-to-text technology to the creation of a marked-up text which exhibits the speech dynamics such as volume, pitch, range, and rate. Currently, most Extended Markup Language (XML) is prepared by hand utilizing no JSAPI specific editors.

It would therefore be desirable to have a method and system for enhanced recognition of speech, including recognition of its dynamics such as volume, pitch and tone. It would further be desirable to allow the real-time representation of such voice dynamics with speech in its textual form. It would further be desirable if such captured voice dynamics were capable of being transmitted along with the text representation to an audible output as a marked up document.

SUMMARY OF THE INVENTION

It is therefore one object of the present invention to provide an improved data processing system.

It is another object of the present invention to provide a method and system for enhanced speech recognition on a data processing system.

It is yet another object of the present invention to provide a method and system for providing speaker voice dynamics in a speech-to-text application within a speech recognition environment on a data processing system.

The foregoing objects are achieved as is now described. A method is disclosed for providing voice dynamics of human utterances converted to and represented by text within a data processing system. The method first selects predetermined parameters for recognition and representation of dynamics in human utterances. The method then creates an enhanced human speech recognition software program implementing said predetermined parameters on a data processing system, wherein said enhanced software program includes an ability to monitor and record human voice dynamics and provide speech-to-text recognition. Also, disclosed is the capturing of said dynamics in a human utterance utilizing said enhanced human speech recognition software and converting said human utterance into a textual representation utilizing said speech-to-text ability of said software. Finally, a method to merge said dynamics along with said textual representation of the human utterance to produce a marked-up text document on said data processing system is disclosed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
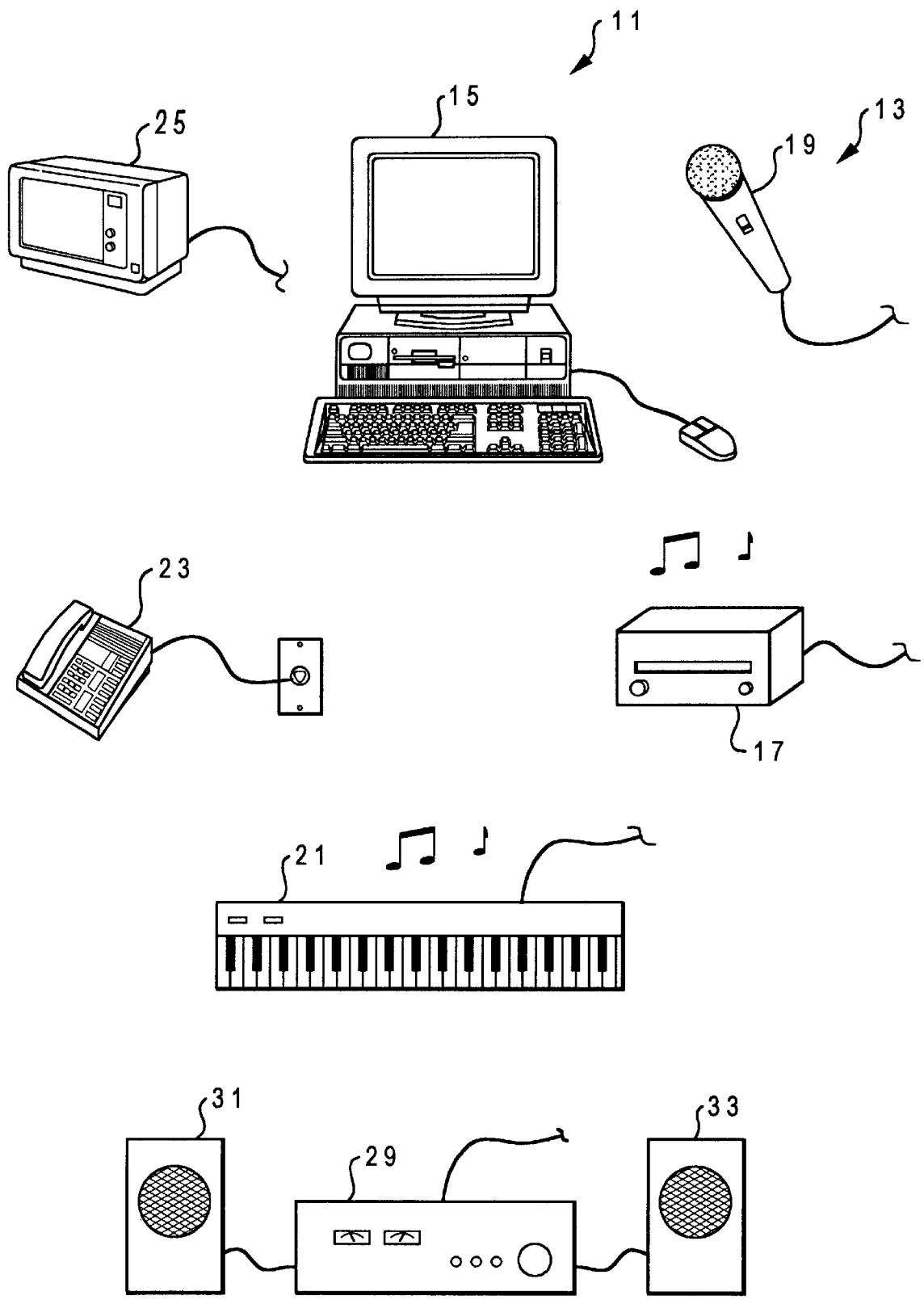
FIG. 1 is a diagram of a multimedia data processing system in accordance with a preferred embodiment of the present invention.

With reference now to the figures and in particular with reference to FIG. 1, there is depicted multimedia data processing system 11 which includes a plurality of multimedia end devices 13 which are electrically connected to computer 15. Those skilled in the art will upon reference to the specification, appreciate that computer 15 may comprise of any personal computer system well known in the prior art such as an IBM Aptiva Computer manufactured by International Business Machines Corporation of Armonk, N.Y. The plurality of multimedia end devices 13 include all types of multimedia end devices which either reproduce or consume real-time and/or asynchronous streamed data and include without limitation video monitor 25. Each of the multimedia end devices 13 may be called by multimedia application software to produce or consume the streamed data.

For example, the operation of CD-ROM player 17 may be controlled by multimedia application software which is resident in and executed by computer 15. The real-time digital data stream generated as an output of CD-ROM player 17 may be received and processed by computer 15 in accordance with instructions of the multimedia application resident therein. For example, the real-time digital data stream may be compressed for storage on a conventional computer floppy disk or for transmission via modem over ordinary telephone lines for receipt by a remotely located computer system which may decompress and play the digital streamed data on analog audio equipment. Alternatively, the real-time data stream output from CD-ROM player 17 may be received by computer 15 and subjected to digital or analog filtering, amplification, and sound balancing before being directed in analog signal form to analog stereo amplifier 29 for output on audio speakers 31 and 33.

Microphone 19 may be utilized to receive analog input signals corresponding to ambient sounds. The real-time analog data stream may be directed to computer 15 converted into digital form and subject to manipulation by the multimedia application software such as a voice recognition program. The digital data may be stored, compressed, encrypted, filtered, subjected to transforms, outputted in analog form to analog stereo amplifier 29, directed as an output in analog form to telephone 23, presented in digitized analog form as an output of a modem for transmission on telephone lines, transformed into visual images for display on video monitor 25 or subjected to a variety of other different and conventional multimedia digital signal processing operations.

In a similar fashion, the analog and digital inputs and outputs of musical keyboard 21, telephone 23 and video monitor 25 may be subjected to conventional multimedia operations in computer 15. In particular, computer 15 may be utilized as a voice recognition system to direct commands and functions for other applications executing on computer 15. Microphone 19 may be utilized to receive speech audio input events, i.e., human speech, the audio input events may be processed using a multimedia application that is directed towards recognizing speech from analyzing inputs from microphone 19.

Figure 2:
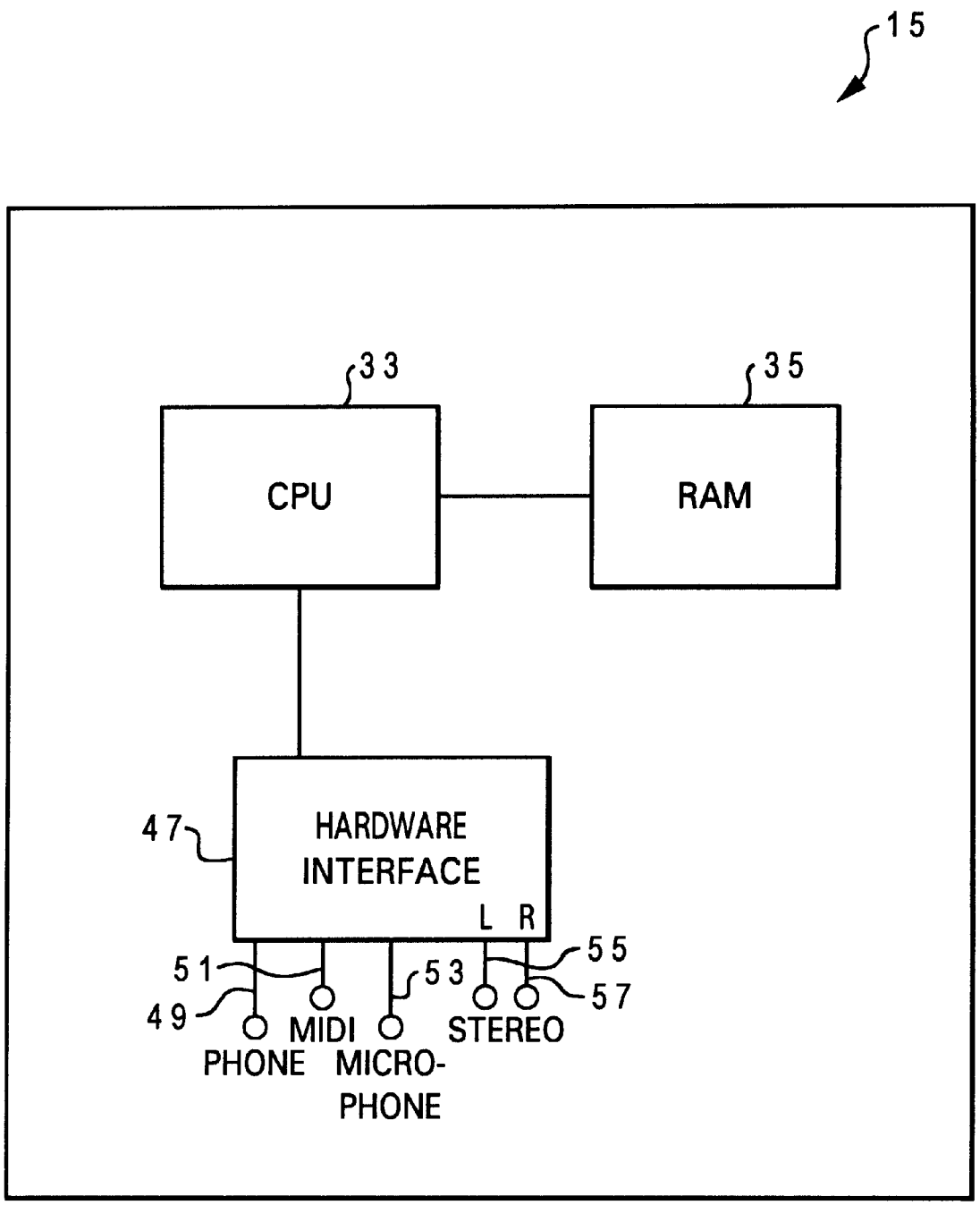
FIG. 2 depicts a block diagram representation of the principal hardware components utilized to execute applications, such as a voice recognition system in accordance with a preferred embodiment of the present invention.

FIG. 2 is a block diagram representation of the principal hardware components which are utilized in the present invention to execute multimedia applications which control the operation of multimedia end device 13. As is conventional in multimedia data processing operations, a central processing unit (CPU) 33 is provided in computer 15. Typically, the multimedia application software, such as a voice recognition application is resident in RAM computer memory 35. CPU 33 executes the instructions which comprise the multimedia application. Inputs and outputs for the various multimedia end device 13 are connected through a digital to analog (D/A) and analog to digital (A/D) converter. In FIG. 2, a telephone input/output 49, a microphone input 53, and stereo outputs 55 and 57 are depicted in an exemplary manner, and are connected through the A/D and D/A converters in hardware interface 47. MIDI input/output 51 also is connected to hardware interface 47.

This invention permits the recognition and display/output of voice dynamics in a human utterance. The invention utilizes current speech-to-text in speech recognition systems to post-process the created text to include voice dynamics. For the purposes of this invention, a human utterance is defined as any and all sounds originating from a human or non-human source capable of being understood as human speech. References to voice or speech or language are further understood to be different representations of human utterance and are utilized interchangeably throughout. In the preferred embodiment, the invention solves the problem by first building the text as is done with current speech recognition products. As this process proceeds, a capture of the dynamics in the voice of the speaker is built in parallel. As a default, this captured data would be applied to the text to provide bolding, italics, and other strictly textual cues to the dynamics the speaker utilized when dictating the message. Additionally, these dynamics are applied to the text to create a marked-up document which would be sent either along with or in place of the strictly textual information.

In the preferred embodiment, the marked-up text created is a set of tagging information, for instance a set of Extended Markup Language (XML) tags that utilize a Data Type Definition (DTD) for speech similar or identical to the Java Speech Markup Language (JSML).

In the preferred embodiment, the utilization of java speech parameters provides for direct input into a Java Speech Application Program Interface (JSAPI) on appropriate Java-enabled devices equipped with a sound synthesis capability to "speak". Creation of voice dynamics in an extended JSML format to highlight particular predefined characteristics of the human utterance allows for direct plug into the JSAPI environment to permit audio output.

By capturing and translating speaker voice dynamics into appropriately marked-up text, a wide variety of devices, both text-only and Java-enabled, would be able to provide richer message information content.

An example of one implementation of the invention follows. In this example, the dynamics of volume, pitch, rate and are captured from a simple spoken sentence "Don't do that!" and later represented in a marked-up text format. In the example below, the parameters utilized/depicted are volume, pitch, and rate. Each parameter is given a normal level corresponding to the level of normal speech, and a range within which the voice dynamics may fluctuate. Volume for example ranges from −5 depicting a soft whisper, to +5 depicting a loud shout. The relative offset gives the actual recorded levels of the dynamics of the human utterance "Don't do that!". Each word is represented by a value. In this illustrative embodiment, each range has a point at which certain visual changes occur in the textual representation of the human utterance. Normal levels are represented by an 'N.' Volume levels above +1 are represented by bolding the text while levels above +3 are represented by All caps. Pitch levels above +2 result in the text being italicized. Each unit of time delay between words is represented by a space (b).

| | CAPTURED INPUT SPEECH | | |
|---|---|---|---|
| Parameters | Normal Level | Relative offset | Output |
| Volume | 0 (−5, 5) | +3, +2, +2 | B/B/B |
| Pitch | 0 (−5, 5) | +2, +1, 0 | I/N/N |
| Rate | 1 (0, 5) | 0, +2 +1 | 0,bb,b |

The output for the above sentence is thus:
DON'T do that!.

For the purposes of this embodiment, the invention is provided with an algorithm which is capable of determining some punctuation (e.g. exclamations and question marks) based on the preceding series of output words. It is understood by those skilled in the art that a speech analysis mechanism may determine based on inflection, tone, spacing, and other dynamic clues that some punctuation in speech may be determined. Note that in the preferred embodiment, the analysis is completed one word at a time. The above example depicting multiple word analysis is solely for illustrative purposes.

Returning now to the figures, FIG. 3 depicts a block diagram representation of the specific processes and components of the present invention. In the preferred embodiment, speech capture device 301 such as a microphone picks up the human utterances and transmits them to a data processing system. Data processing system is described in FIGS. 1 and 2 including its hardware components. FIG. 3 depicts the CPU of data processing system with the software components required for the implementation of the invention.

Data processing system CPU 33 contains software applications or algorithms. A speech-to-text application 305A creates a text file representation of the human utterance. Concurrently with the creation of the text file, a sound file is generated from the human utterance utilizing a voice recorder 305B. This sound file is then analyzed within a voice analysis software environment 307 which is capable of detecting the voice dynamics and recording and storing these dynamics (as a data file) within data processing system CPU 33. Voice analysis software environment requires additional hardware components for its interface. These components may exist either internally within the data processing system or externally. The data file and text file are then combined within a marked-up text generator software 309. Marked up text generator software 309 provides a marked-up text to output device 311 for user interface.

Figure 3A:
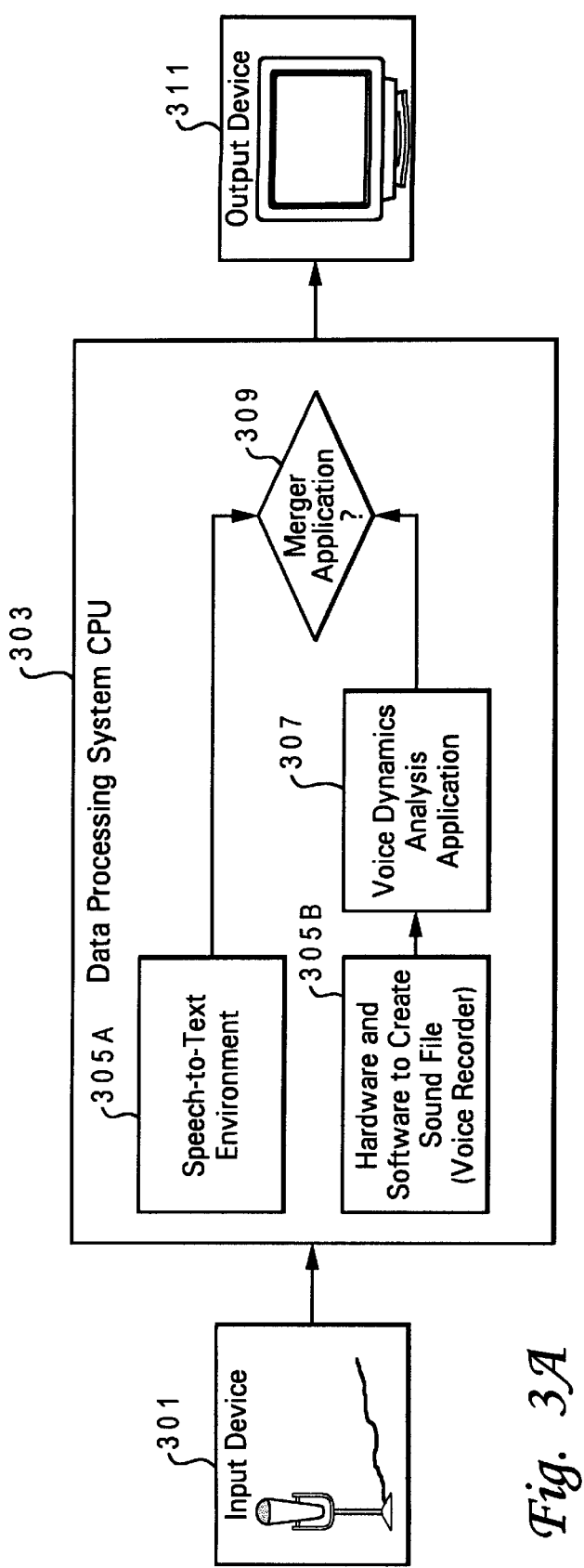
FIGS. 3A and 3B are block diagrams depicting the components and processes involved in the implementation of a voice recognition system which captures voice dynamics in accordance with a preferred embodiment of the present invention.
Figure 3B:
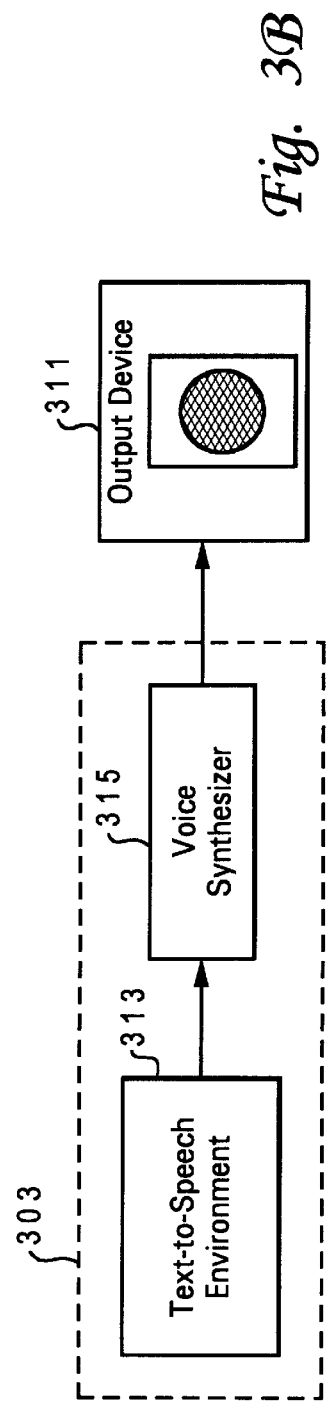

FIG. 3B depicts another representation of the output device of FIG. 3A wherein the output is a voice output to a user. Output device 311 is connected to an enhanced text-to-speech environment 303 which consists of a text-to-speech application 313 which processes the marked-up text language produced in the implementation of the invention and a voice synthesizer 315 which produces the audio output.

In an extended embodiment of this invention, JSML processing on JSAPI equipped devices could be utilized to instantiate the output. Text-to-speech application 313 is responsible for converting the source information to JSML text utilizing any special knowledge it has about the dynamics, content and format of the source information. Appropriate voice synthesizers 315 are connected to the data processing system and gives out electronic messages representing the marked-up output. These outputs are then transmitted to a user via an output device 317 such as a speaker.

It is understood that references to specific software components are for illustrative purpose only. All software components of the invention may be implemented within one general software application with specific component algorithm. Further, references to a software algorithm does not preclude the existence of the software dependent on related hardware and other software components.

In another embodiment, speech capture device is first transmitted to a voice recorder and de-synthesizer which analyzes the sound for dynamics prior to transmission to data processing system. These sound dynamics are then transmitted along with the human utterances to the data processing system. The signals exist as electrical impulses and the data processing system is equipped with the appropriate hardware components to interpret these signals as voice dynamics and apply them to the human utterance. This process occurs instantaneously so that not delay in transmission occurs and the voice dynamics correspond to their appropriate human utterance.

If a synthesizer supplies the parser with a document type definition (DTD) for JSML, then the synthesizer's work is significantly reduced. Having a DTD allows the application to utilize the full power of XML for generating text, for example, entity references that can act as a shorthand for repetitive JSML and then to utilize generic text processing tools for generating the JSML.

Figure 4:
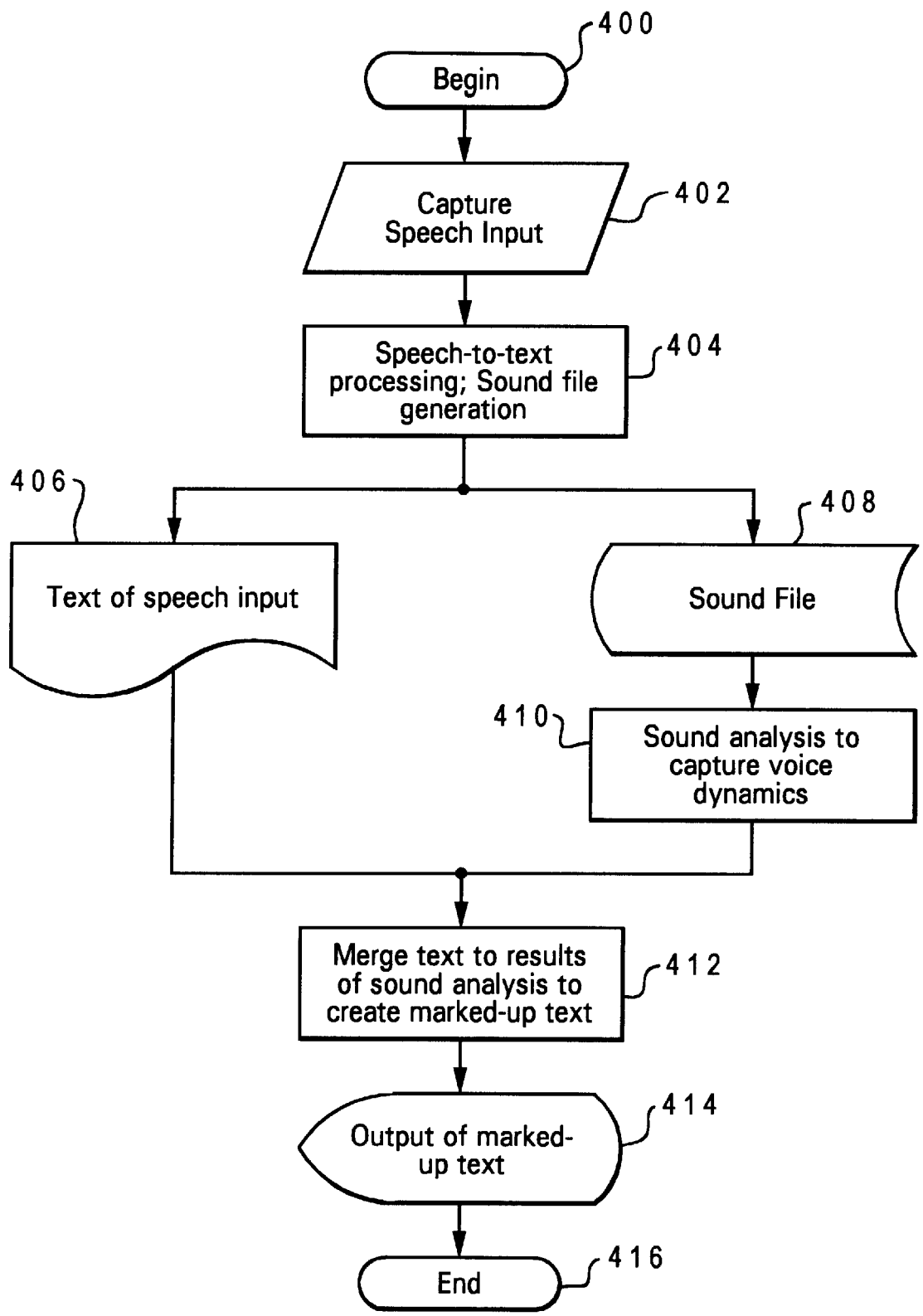
FIG. 4 is a flow chart illustrating the logical processing involved in the capturing of voice dynamics in accordance with a preferred embodiment of the present invention.

FIG. 4 is a flow chart depicting the logic flow of the processing of the preferred embodiment of the present invention. The process begins (step 400) with the capture of a speech input (step 402) As discussed previously, this capture is implemented utilizing a speech capture device such as a microphone and voice recorder in the preferred embodiment. The process continues with the captured input being sent to a data processing system where speech-to-text processing is completed (step 404). The process then takes two separate paths, the first of creating a text file (step 406) and the second of creating a sound file (step 408). Sound file, once created, is analyzed (step 410). This analysis process involves assessing the dynamics of each word relative to a set of predefined parameters. For example, the volume of each word is compared to a predefined normal volume level. Another example involves comparing the word's relative velocity/tempo with a predefined normal tempo level. Word distance in time is utilized to determine hyphenated phases, etc. In the preferred embodiment, the analysis is undertaken relative to each of the words in the human utterance in addition to the analysis against the predefined normal levels. The complexity of the analysis may vary depending on the perceived requirements of the software developer. It is understood by those skilled in the art that the analysis is in no way limited to the components described herein.

Once the analysis (step 410) is completed, the text file and results of the analysis of the sound file are merged to produce a marked-up text (step 412). In the preferred embodiment, the merging of the information is done so that words in the text file are linked to the portion of the sound file that corresponds to the words. This merge process may also be completed instantaneously with the creation of the original textual representation. Alternatively, in another embodiment, tags are placed in the text and dynamic file corresponding to the correct location of the dynamic representations in the marked-up document. The marked-up text includes visual characteristics such as bolding, hyphenation, and italics in the preferred embodiment of the invention. However, the analysis may encompass a wide range of voice dynamics capable of detection and representation in text or/and audio output format. Thus, non-visual characteristics are included and are represented within textual representations as code words such as is utilized by standard JSML documents. The characteristics may also be represented as JSML for JSAPI targets and other XML tag sets for other devices. The process of the invention continues with an output of the marked-up text file (step 414) in the preferred embodiment. The process then terminates (step 416).

While the invention has been particularly shown and described with reference to a preferred embodiment, it will be understood by those skilled in the art that various changes in form and detail may be made therein without departing from the spirit and scope of the invention. For example, while the invention is described with the speech-to-text analysis completed prior to the voice dynamics and subsequent merger, it is understood that both may be completed concurrently. Further, nothing prevents the voice dynamics analysis from being completed first.

What is claimed is:

1. A method for providing voice dynamics of human utterances converted to and represented by text within a data processing system, said method comprising:
   selecting predetermined parameters for recognition and representation of dynamics in human utterances;
   creating an enhanced human speech recognition software program implementing said predetermined parameters on a data processing system, wherein said enhanced software program includes an ability to monitor and record human voice dynamics and provide speech-to-text recognition;
   capturing said dynamics in a human utterance utilizing said enhanced human speech recognition software;
   converting said human utterance into a textual representation utilizing said speech-to-text ability of said software; and
   merging said dynamics along with said textual representation of the human utterance to produce a marked-up text document on said data processing system.

2. The method of claim 1, further comprising the steps of:
   transmitting said marked-up document along with said textual representation to an output device of said data processing system.

3. The method of claim 1, further comprising the steps of:
   converting said marked-up text file into a voice file utilizing a text-to-speech application; and
   providing said voice file with said voice dynamics utilizing an output voice synthesizer to an output device of said data processing system.

4. The method of claim 1, wherein said selecting step further includes the steps of:
   determining levels for said speech parameters to represent normal speech patterns; and
   creating a range of possible parameter values based on said levels to represent a plurality of voice dynamics wherein point within said range corresponds to a specific representation of a given voice dynamic.

5. The method of claim 1, wherein said capturing step captures a plurality of human voice dynamics including tone, emphasis, inflection and volume.

6. The method of claim 1, wherein said capturing step further records the voice dynamics concurrently with the textual representation of said human utterance.

7. The method of claim 1, whereby said merging step further overlays said textual representation of said human utterance with its corresponding dynamics to provide a visual representation of the dynamics, wherein said visual representation is composed of predefined characteristics which include bolding, italic, hyphenation, and strictly textual cues to the dynamics associated with said human utterance.

8. The method of claim 1, wherein said merging step utilizes a set of tagging information, and further wherein said tagging information includes a set of extended markup language (XML) tags which utilize a data type definition for speech.

9. A system for providing voice dynamics of human utterances converted to and represented by text within a data processing system, said system comprising:
   means for selecting predetermined parameters for recognition and representation of dynamics in human utterances;
   means for creating an enhanced human speech recognition software program implementing said predetermined parameters on a data processing system, wherein said enhanced software program includes an ability to monitor and record human voice dynamics and provide speech-to-text recognition;
   means for capturing said dynamics in a human utterance utilizing said enhanced human speech recognition software;
   means for converting said human utterance into a textual representation utilizing said speech-to-text ability of said software; and means for merging said dynamics along with said textual representation of the human utterance to produce a marked-up text document on said data processing system.

10. The system of claim 9, further comprising means for transmitting said marked-up document along with said textual representation to an output device of said data processing system.

11. The system of claim 9, further comprising:
means for converting said marked-up text file into a voice file utilizing a text-to-speech application; and
means for providing said voice file with said voice dynamics utilizing an output voice synthesizer to an output device of said data processing system.

12. The system of claim 9, wherein said selecting means further includes:
means for determining levels for said speech parameters to represent normal speech patterns; and
means for creating a range of possible parameter values based on said levels to represent a plurality of voice dynamics wherein point within said range corresponds to a specific representation of a given voice dynamic.

13. The system of claim 9, wherein said capturing means captures a plurality of human voice dynamics including tone, emphasis, inflection and volume.

14. The system of claim 9, wherein said capturing means further records the voice dynamics concurrently with the textual representation of said human utterance.

15. The system of claim 9, whereby said merging means further overlays said textual representation of said human utterance with its corresponding dynamics to provide a visual representation of the dynamics, wherein said visual representation is composed of predefined characteristics which include bolding, italic, hyphenation, and strictly textual cues to the dynamics associated with said human utterance.

16. The system of claim 9, wherein said merging means utilizes a set of tagging information, and further wherein said tagging information includes a set of extended markup language (XML) tags which utilize a data type definition for speech.

17. A computer program product for providing voice dynamics of human utterances converted to and represented by text within a data processing system, said program product comprising of:
a storage medium;
program instructions stored or said storage medium for:
selecting predetermined parameters for recognition and representation of dynamics in human utterances;
creating an enhanced human speech recognition a software program implementing said predetermined parameters on a data processing system, wherein said enhanced software program includes an ability to monitor and record human voice dynamics and provide speech-to-text recognition;
capturing said dynamics in a human utterance utilizing said enhanced human speech recognition software;
converting said human utterance into a textual representation utilizing said speech-to-text ability of said software; and
merging said dynamics along with said textual representation of the human utterance to produce a marked-up text document on said data processing system.

18. The computer program product of claim 17, further comprising program instructions for transmitting said marked-up document along with said textual representation to an output device of said data processing system.

19. The computer program product of claim 17, further comprising program instructions for:
converting said marked-up text file into a voice file utilizing a text-to-speech application; and
providing said voice file with said voice dynamics utilizing an output voice synthesizer to an output device of said data processing system.

20. The computer program product of claim 17, wherein said program instructions for said selecting step further includes program instructions for:
determining levels for said speech parameters to represent normal speech patterns; and
creating a range of possible parameter values based on said levels to represent a plurality of voice dynamics wherein point within said range corresponds to a specific representation of a given voice dynamic.

21. The computer program product of claim 17, wherein said program instructions for said capturing step includes program instructions for capturing a plurality of human voice dynamics including tone, emphasis, inflection and volume.

22. The computer program product of claim 17, wherein said program instructions for said capturing step further permits recording the voice dynamics concurrently with the textual representation of said human utterance.

23. The computer program product of claim 17, whereby said program instructions for said merging step further includes program instructions to overlay said textual representation of said human utterance with its corresponding dynamics to provide a visual representation of the dynamics, wherein said visual representation is composed of predefined characteristics which include bolding, italic, hyphenation, and strictly textual cues to the dynamics associated with said human utterance.

24. The computer program product of claim 17, wherein said program instructions for said merging step utilizes a set of tagging information, and further wherein said tagging information includes a set of extended markup language (XML) tags which utilize a data type definition for speech.

* * * * *